Feb. 4, 1969

D. N. SHAW 3,425,452

COUPLING

Filed Feb. 1, 1966

INVENTOR.
DAVID N. SHAW.
BY
Frederick E. McMullen
ATTORNEY.

United States Patent Office 3,425,452
Patented Feb. 4, 1969

3,425,452
COUPLING
David N. Shaw, Liverpool, N.Y., assignor to Carrier Corporation, Syracuse, N.Y., a corporation of Delaware
Filed Feb. 1, 1966, Ser. No. 523,989
U.S. Cl. 138—89        11 Claims
Int. Cl. F25d 45/00; F16l 35/00, 55/10

ABSTRACT OF THE DISCLOSURE

A coupling device for connection to a tubular member including a female member having a relatively thin section for receiving the tubular member, said section having an annular rib so as to form with the unattached end thereof a substantial 3-point engagement with the tubular member when a male fitting causes forcible mechanical engagement between the female member and the tubular member, the configuration of the rib being such that a sealing or brazing ring may be accommodated without disturbing the 3-point feature.

---

This invention relates to tube couplings and, more particularly, to flareless tube couplings usable with refrigeration systems.

"Quick coupling" devices, where used with refrigeration systems, permit factory assembly with precharging of the system components in sections which ideally are field assembled using precharged lengths of refrigerant line from a tubing package at the point of use with a minimum of time and skill. Present "quick couplings," however, have several significant drawbacks, one of which is the necessity that each of the male or female coupling parts be factory soldered to the ends of the refrigerant lines to be interconnected. Additionally, each male and female coupling part has a rupturable seal to retain the refrigerant charge which, on coupling of the male and female parts, is cut open by knife members integral with the coupling parts.

Since one part of the coupling is soldered to the ends of each tubing package line, the line cannot be cut to length at the time of installation to accommodate the peculiar and individual requirements of the installation without later resoldering of the coupling parts. To offset this, a number of tubing packages, each having different length lines with the coupling parts soldered thereto, must be stocked. Where a suitably sized tubing package is not available, refrigerant lines longer than that required for the system installation are sometimes used and the unused length coiled and stored in the installation. This avoids the difficult job of cutting, resoldering, and recharging the lines in the field.

The rupturable seals in each coupling part, which prevent escape of the refrigerant charge, require a knife structure to perforate the seal at the time of coupling. This necessitates that the coupling be tightened in a strict sequence to avoid internal damage to the coupling itself. It further requires two wrenches since a certain relative movement must be effected between the coupling parts.

It is a principal object of the present invention to provide a new and improved two-piece flareless tube coupling.

It is a further object of the present invention to provide an improved tube coupling apparatus permitting either a mechanical or soldered joint.

It is an object of the present invention to provide a flareless tube coupling adapted to sealingly grip the periphery of the tube being coupled at spaced points along the tube periphery.

It is an object of the present invention to provide a tube coupling apparatus for refrigeration systems effective when coupled to form a frost seal protecting the coupling against ice damage.

It is an object of the present invention to provide a tube coupling with means automatically indicating completion of the coupling joint to prevent overtightening of the coupling and undue crushing of the tube.

It is a further object of the present invention to provide a coupling and removable plug assembly for sealing a precharged refrigerant section prior to use with a refrigeration system.

It is an object of the present invention to provide a simplified tube coupling which is reusable.

It is a further object of the present invention to provide a flareless tube coupling which does not require finishing or dressing of the tube end to secure a tight seal.

This invention relates to a coupling for a cylindrical tube which comprises a body member having a cylindrical bore therethrough adapted to slidably receive a tube to be coupled in close fitting engagement therewith, the body including a relatively rigid portion having means thereon adapted to engage a coupling element in assembled relation therewith and a cylindrical relatively thin deformable portion of substantially uniform wall thickness throughout its length coaxially aligned with the relatively rigid portion and adapted to closely and telescopically overlie the exterior surface of a tube when in an assembled relation therewith, the deformable portion having a radially outwardly bulged wall section formed between the ends thereof, the junction of one edge of the inner wall of the outwardly bulged wall section with the wall of the bore being relatively sharp and forming a sharp annular toothed edge, the junction of the other edge of the inner wall of the outwardly bulged wall section with the wall of the bore being rounded and forming a relatively smooth annular rounded edge whereby a coupling element may be assembled with the body member to deform the sharp annular toothed edge and the smooth annular rounded edge of the outwardly bulged portion radially inwardly into sealing and gripping engagement with the exterior surface of a tube telescopically received in the bore to cause the sharp annular toothed edge to bite into the surface of the tube in one mode of assembly thereof. In another mode of assembly, fusible sealing means are disposed between the body member and the tube to sealingly secure the tube within the body member cylindrical bore.

Other objects and advantages of the invention will be perceived from the ensuing description and drawings in which.

Figure 1:
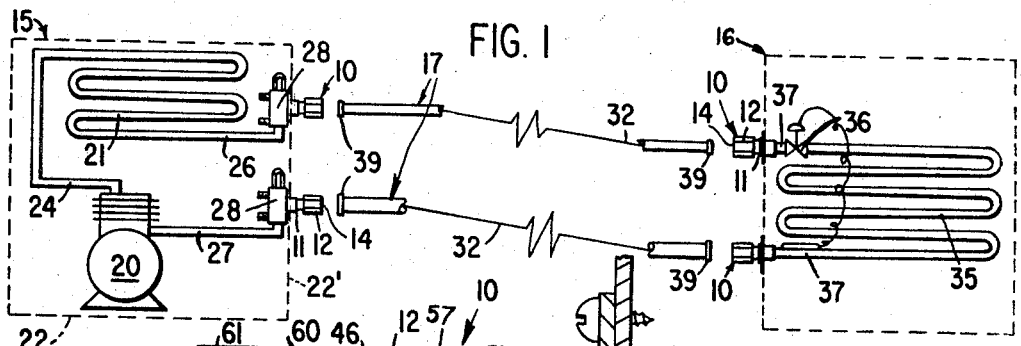
FIGURE 1 is a diagrammatic view showing preassembled and precharged refrigerant system sections adapted to be connected in a closed refrigerant circuit by the tube couplings of the present invention.

In FIGURE 1 of the drawings there is shown a refrigeration system separated into preassembled and packaged components adapted to be connected one with the other by couplings or fittings 10 to form a closed refrigeration system. In the exemplary showing, the refrigeration system components comprise condensing section 15, evaporator section 16, and tubing package 17. Condensing section 15 includes refrigerant compressor 20 and heat exchanger coil 21 housed within enclosure 22. Refrigerant line 24 connects the discharge or high pressure side of compressor 20 with coil 21. Lines 26, 27 lead from coil 21 and the suction or intake side of compressor 20 to service valves 28. Valves 28 are preferably fastened to the inside of wall 22' of enclosure 22. The male member 11 of coupling 10 projects through wall 22' to permit refrigerant lines or tubes 32 of tubing package 17 to be coupled thereto, as will be more apparent hereinafter. Preferably, coupling members 11 are integral with service valves 28.

Following factory preassembly of condensing section 15, section 15 is charged with the principal quantity of system refrigerant. Plugs 14 prevent loss of the refrigerant charge. Additionally, service valves 28 are closed.

Evaporator section 16 includes heat exchanger coil 35 and a suitable system refrigerant expansion means, for example thermal expansion valve 36, connected thereto. Coupling members 11 are factory assembled to lines 37 leading to coil 35 and expansion valve 36. Evaporator section 16 has a relatively low pressure or holding charge of system refrigerant to prevent contamination of the system upon assembly thereof. Plugs 14 seal lines 37. Plugs 14 are held in place by female coupling members 12, as will be more apparent hereinafter.

Tubing package 17 comprises two lengths of refrigerant line 32 factory charged with the system refrigerant at a relatively low pressure. Lines 32 are sealed by caps 39.

Figure 2:
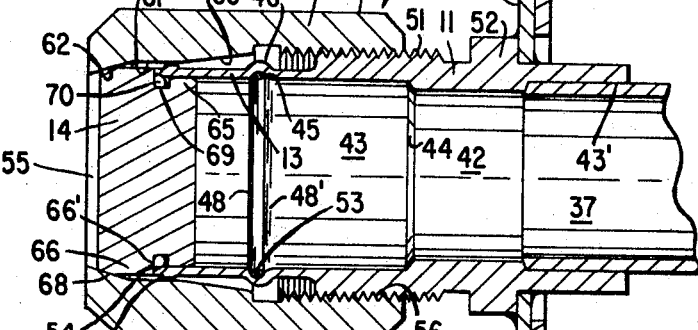
FIGURE 2 is a sectional view illustrating the tube coupling and refrigerant tube plug assembly of the present invention.

Referring to FIGURE 2 of the drawings, male coupling member 11, which is generally cylindrical, has a fluid conducting bore 42 therethrough counterbored at 43. The wall section 13 of member 11, which defines the outer part of counterbore 43, is relatively thin and of substantially uniform cross section. Counterbore 43 is dimensioned to slidably yet snugly receive the end of a refrigerant line. Shoulder 44 serves as a stop for the inserted line.

Where coupling 10 is used with condensing section 15, the coupling members 11 may be integral with service valves 28. Where coupling 10 is used to interconnect refrigerant lines, for example line 32 of tubing package 17 with line 37 of evaporator section 16, the opposite end of coupling member 11 is counterbored at 43' to accommodate the second refrigerant line. In the arrangement shown in FIGURE 1 of the drawings, refrigerant lines 37 of evaporator section 16 each has a coupling member 11 soldered thereto. Alternately, coupling member 11 may be double-ended and a second female coupling member 12 provided to mechanically join each line 37 with a coupling member 11.

Figures 3, 7:
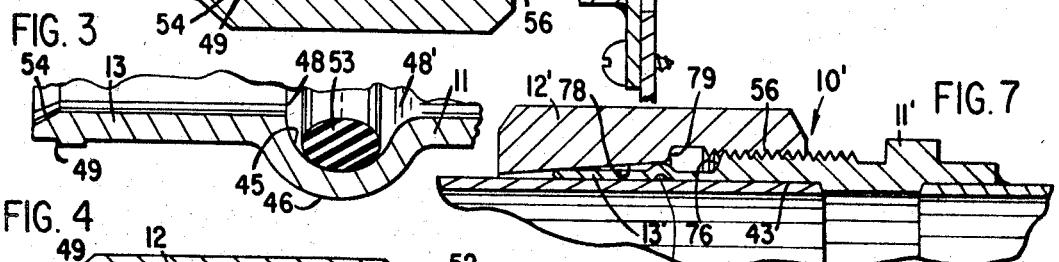
FIGURE 3 is an enlarged sectional view showing the tube biting tooth of the coupling in FIGURE 2.
FIGURE 7 is a sectional view of a second coupling where the coupling parts are shown in first contact.

Referring particularly to FIGURE 3, wall section 13 of coupling member 11 is flanged or bulged outwardly, forming annular recess 45 in the wall of counterbore 43 and an exterior rib-like projection 46. The axial outer wall of recess 45 is nearly perpendicular to the wall of counterbore 43 and forms a relatively sharp biting edge or tooth 48. The axial inner wall of recess 45 is rounded at 48' to facilitate insertion of the refrigerant tube end into counterbore 43. Rib-like projection 49 is formed on wall section 13 adjacent the open end of counterbore 43. The outer dimension of rib 49 is less than the outer dimension of rib 46.

Coupling member 11 is exteriorly threaded at 51, the outer dimension of threaded part 51 being slightly greater than the outer dimension of rib-like projection 46. Flange 52 forms a generally annular stop limiting threaded movement of the female coupling member 12, as will be more apparent hereinafter. Counterbore 43 is bevelled at 54 to facilitate insertion of the refrigerant line therewithin.

A ring-like seal 53 may be positioned within recess 45 to enhance the seal between coupling member 11 and the outer wall of the refrigerant tube therewithin, particularly where the wall of the tube is scratched, scored, or otherwise damaged. Seal 53 may comprise any suitable commercially available resilient or deformable sealing material, for example Teflon, neoprene, relatively soft metal compounds, such as lead, etc. Seal 53 may comprise a suitable soldering material to permit solding of the refrigerant line to the male coupling member 11 where desired.

Female coupling member or nut 12 has a tube receiving bore 55 therethrough internally threaded at 56 for coupling engagement with threads 51 of coupling member 11. The outside wall 57 of nut 12 is hexangular to permit nut 12 to be tightened on member 11.

The wall of bore 55 in nut 12 includes a first tapered, cone shaped camming surface 60 between threads 56 and cylindrical wall section 61. A second tapered, cone shaped camming surface 62 having a slope substantially greater than that of camming surface 60 extends from wall section 61 to the outer end of nut 12.

Plug 14, which is generally cylindrical, has a locating part 65 dimensioned for slidable insertion within bore 43 of coupling member 11. Flange 66 limits insertion of plug 14 in counterbore 43. The outer edge of flange 66 is bevelled at 68, the slope of bevel 68 being approximately equal the slope of camming surface 62 of nut 12. Recess 69 in the outside wall of plug 14 accommodates ring-like seal 70. The outer dimension of seal 70 is slightly greater than the outer dimension of part 65 and on insertion of plug 14 in counterbore 43 seal 70 is trapped between the inside wall including bevel section 54 of counterbore 43 and shoulder 66' of flange 66.

To retain the factory refrigerant charge in condenser and evaporator sections 15, 16, lines 26, 27 of section 15 and lines 37 of section 16 are closed with plugs 14. Referring to FIGURE 2 of the drawings, threading of nut 12 onto coupling member 11 over plug 14 brings camming surface 62 thereof into engagement with bevel 68 of plug 14 forcing plug 14 into counterbore 43. Seal 70 on plug 14 is resiliently compressed between inside wall bevel 54 of coupling member 11 and shoulder 66' of flange 66 to provide a fluid tight seal.

When nut 12 is initially unthreaded to remove plug 14, seal 70 expands and forces plug 14 slightly outwardly facilitating hand removal of plug 14 and reducing the tendency of plug 14 to bind or stick.

Figures 4, 8:
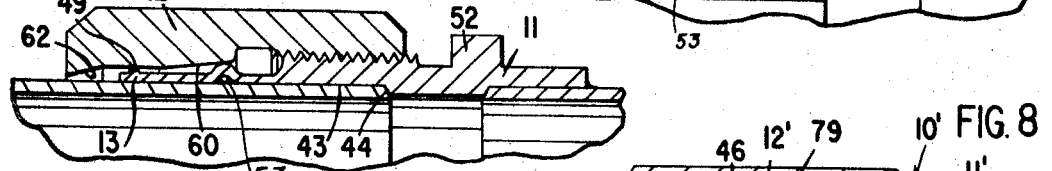
FIGURE 4 is a sectional view of the tube coupling of FIGURE 2 showing the coupling parts in first contact.
FIGURE 8 is a sectional view of the coupling of FIGURE 7 showing the coupling parts on completion of the coupling joint.

Cap 39 may be removed from the end of tube 32 of tubing package 17, and, where necessary, the refrigerant tube cut to a selected length. The end of the refrigerant tube is inserted through bore 55 of nut 12 into counterbore 43 of coupling member 11 until stopped by shoulder 44. Nut 12 is screwed onto coupling member 11, initial tightening of nut 12 bringing camming surface 60 thereof into contact with rib 46, as shown in FIGURE 4. As nut 12 is tightened, camming surface 60 contracts rib 46 inwardly causing the walls of counterbore 43 in the vicinity of recess 45 to tighten about the inserted tube and compacting and compressing seal 53, where used, about the outer wall of the tube.

Figure 5:
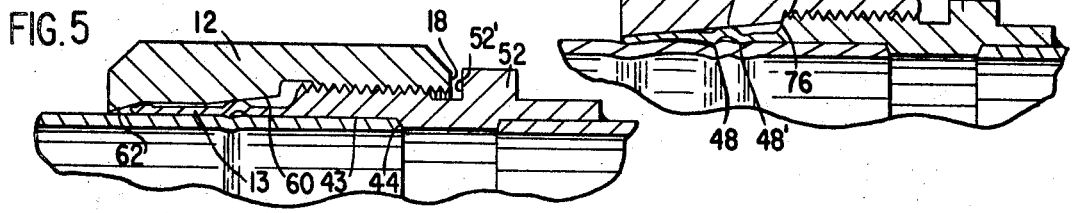
FIGURE 5 is a sectional view of the tube coupling of FIGURE 2 showing the coupling parts following partial tightening of the coupling.
Figure 6:
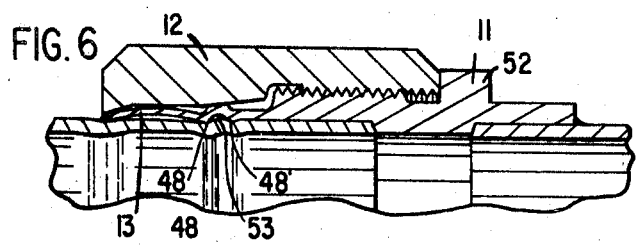
FIGURE 6 is a sectional view of the tube coupling of FIGURE 2 showing the coupling parts on completion of the coupling joint.

As nut 12 is tightened camming surface 62 contacts rib 49 of member 11, as seen in FIGURE 5. On additional tightening of nut 12 camming surface 60 further compresses and contracts rib 46 to bring tooth 48 of recess 45 into biting engagement with the outer wall of the refrigerant tube in counterbore 43 and form a fluid tight seal. Concurrently rounded edge 48' of recess 45 is contracted into fluid tight gripping relation with the periphery of the refrigerant tube. Similarly, seal 53, where used, is contracted into fluid tight relationship with the refrigerant tube periphery. Note FIGURE 6 of the drawings.

Camming surface 62 of nut 12, which contacts rib 49 of coupling member 11, contracts wall section 13 at the tube receiving end of counterbore 43 into fluid tight gripping relationship with the periphery of the refrigerant tube. The seal established between rib 49 of coupling member 11 and camming surface 62 of nut 12 prevents ingress of moisture into coupling 10 to obviate potential frost damage. Nut 12 is tightened until the leading edge 18 thereof tightly abuts wall 52' of flange 52. Flange 52 prevents overtightening of nut 12. Additionally, the tight engagement of flange wall 52' with leading edge 18 of coupling member 12 forms a moisture seal preventing potential frost damage to the coupling 10.

The slope of camming surface 60 of nut 12, which is less than the slope of camming surface 62 thereof, permits the relatively large compressive force required to compress rib-like projection 46 inwardly to be realized with a relatively small manual effort. As nut 12 is tightened to bring camming surface 62 thereof into contact with rib 49 of coupling member 11, the force required to turn nut 12 increases signalling initiation of the final stage of coupling movement.

In the coupling shown in FIGURES 7 and 8 wherein like numerals refer to like parts, the outer edge of wall section 13' of male coupling member 11' is relatively smooth. The wall section between wall section 13' and threaded portion 51 forms a shoulder 76.

Camming surface 78 of nut 12' comprises a uniformly tapered internal wall section. Wall 79 between camming surface 78 and threads 56 forms a shoulder cooperating with shoulder 76 of coupling member 11' to prevent overtightening of nut 12' on coupling member 11'.

As nut 12' of coupling 10' is tightened onto coupling member 11' following positioning of the refrigerant tube in counterbore 43, camming surface 78 contacts rib 46 and the outer edge of wall section 13'. As coupling member 12' is tightened, camming surface 78 compresses rib 46 to drive the relatively sharp annular edge or tooth 48 into biting engagement with the perhiphery of the refrigerant tube while contracting edge 48' and a progressively increasing part of wall section 13' into gripping engagement with the refrigerant tube. The cone-like or tapered configuration of camming surface 78 progressively contracts wall section 13' radially inwardly, the maximum contraction being effected at the refrigerant tube receiving end of counterbore 43 thereof to establish a seal between the outer or tube receiving end of wall section 13' and the outer wall of the tube therewithin. Additionally, a seal is established between the outside wall of section 13' of member 11' and camming surface 78 of nut 12' to prevent ingress of moisture into coupling 10'.

It is understood that coupling members 11 and 11' may be soldered to the refrigerant tube end instead of being mechanically coupled thereto through the use of nuts 12, 12', respectively. Where seal 53 is comprised of a nonmetallic material, for example neoprene, the seal normally acts as a dam preventing inward flow of the soldering compound therebeyond. Should resealing of the soldered joint be subsequently undertaken, as for example following repair to the refrigeration system, the coupling member 11 or 11' may be cut off between rib 46 and threaded portion 56 and the tube end inserted within the foreshortened counterbore of the coupling member. The tube end is then soldered to the reduced size coupling member 11 or 11'.

Similarly, where a mechanical joint is formed, the coupling joint may be resealed by cutting off the coupling member 11 or 11' between rib 46 and threaded portion 56 and thereafter soldering the tube end therewithin.

It is understood that where plug 14 is used with coupling 10', the slope of bevel section 68 of plug 14 is made substantially equal the slope of cone shaped camming surface 78 of nut 12'.

While I have described a preferred embodiment of this invention, it will be understood that the invention is not limited thereto since it may be otherwise embodied within the scope of the following claims.

I claim:
1. A coupling for a cylindrical tube comprising:
 (A) a body member having an axially extending cylindrical bore therethrough for slidably receiving a tube to be coupled in close fitting engagement therewith, said body including:
  (1) an externally threaded relatively rigid portion;
  (2) a realtively thin deformable wall portion extending axially outwardly from said threaded portion;
  (3) a radially outwardly bulged wall section of substantially the same thickness as the remainder of said deformable wall portion disposed intermediate the ends of said deformable wall portion forming an annular inwardly open recess therein;
  (4) a radially outwardly extending annular rib adjacent the axially outer end of said deformable wall portion;
  (5) an annular deformable sealing ring disposed in said annular recess in said deformable wall portion;
 (B) a coupling nut having an axially extending cylindrical bore therethrough, an internally threaded portion adjacent the axially inner portion of said nut, said threaded portion being adapted to engage the external threads on the body member of said coupling; and an annular interior conical cam surface disposed on said nut axially outwardly of said threaded portion, said cam surface tapering radially inwardly toward the axially outer end of said coupling nut, said conical cam surface being adapted to engage the exterior surface of said annular bulge and the radially outwardly extending annular rib on the deformable portion of said body member when said coupling is assembled in a manner to join a tube therewith to thereby compress said deformable body portion so as to form three annular sealing regions on the surface of said tube being joined and to compress said annular sealing ring into fluid tight engagement with the exterior surface of said tube.

2. A coupling as defined in claim 1 wherein the annular interior conical cam surface on said coupling nut comprises a first interior conical cam surface tapering radially inwardly toward the axially outer end of said coupling nut; and a second interior conical cam surface tapering radially inwardly toward the axially outer end of said coupling nut; said second cam surface being disposed axially outwardly on said coupling nut from said first cam surface; said first cam surface engaging the radially outwardly bulged section on the deformable portion of said body member and said second cam portion engaging said annular rib on said deformable portion when said coupling is assembled to join a tube therewith.

3. A coupling as defined in claim 2 wherein said second annular conical cam surface is inclined to the axis of said coupling at a greater angle than said first conical cam surface to cause greater resistance to tightening of said coupling nut when assembly of said coupling is near completion.

4. A coupling as defined in claim 1 including:
 (A) a radially outwardly extending shoulder disposed on said rigid portion of said body member axially inwardly of said threaded portion; and
 (B) a shoulder on the axially inner end of said coupling nut for engaging said shoulder on the rigid portion of said body member to form a seal between said nut and said body member to inhibit entrance of moisture into said coupling at the axially inner end of said coupling and to prevent overtightening of said coupling.

5. A coupling as defined in claim 1 wherein the axially inner edge of said annular recess in the deformable body portion meets the cylindrical bore in a rounded annular edge for facilitating insertion of a tube to be coupled into said bore, said rounded annular edge being compressed into sealing engagement with a tube to be coupled by said coupling nut; and the axially outer edge of said annular recess meets said cylindrical bore at substantially a right angle to form a sharp annular toothed edge for gripping and biting into said tube to be coupled.

6. A coupling according to claim 1 including a removable generally cylindrical closure element for maintaining said body member tube receiving bore closed prior to insertion of a tube therewithin, said closure element including a part dimensioned for snug reception within the end of said body member tube receiving bore, and an outwardly projecting shoulder adjoining said insertable part abutable with the end of said deformable portion to limit insertion of said closure element within said body member bore, and ring-like sealing means on said closure element insertable part arranged, upon insertion of said closure element insertable part into said body member bore, to be sealingly trapped between said body member deformable portion and said closure element.

7. A coupling according to claim 6 in which the outer wall of said closure element is tapered to provide an annular bevelled wall section adapted, upon assembly of said coupling nut with said body member, to abut the coupling nut whereby the coupling nut, when assembled with said body member, forces said closure element into said body member tube receiving bore against the resiliency of said ring-like sealing means so that said ring-like seal biases said closure element radially outwardly to facilitate removal of said closure element from said body member tube receiving bore upon disassembly of said coupling.

8. A coupling according to claim 1 in which said sealing means comprises a fusible sealing material effective following heating to sealingly secure said tube with said body member tube receiving bore.

9. A coupling for a cylindrical tube comprising:
(A) a body member having an axially extending cylindrical bore therethrough for slidably receiving a tube to be coupled in close fitting engagement therewith, said body including:
  (1) a relatively rigid portion having external threads thereon;
  (2) a relatively thin deformable wall portion extending axially outwardly from said threaded portion;
  (3) a radially outwardly bulged wall section of substantially the same thickness as the remainder of said deformable wall portion disposed intermediate the ends of said deformable wall portion forming an annular inwardly open recess therein, the axially inner edge of said recess meeting said cylindrical bore in a smooth rounded annular edge for facilitating insertion of a tube to be coupled into said bore and the axially outer edge of said recess meeting said cylindrical bore at substantially a right angle to form a sharp annular toothed edge for gripping and biting into said tube to be coupled;
  (4) a radially outwardly extending annular rib adjacent the axially outer end of said deformable wall portion;
  (5) an annular deformable sealing ring disposed between said rounded annular edge and said sharp annular edge in said annular recess in said deformable wall portion;
(B) a coupling nut having an axially extending cylindrical bore therethrough, said nut including:
  (1) an internally threaded portion adjacent the axially inner portion of said nut, said threaded portion being adapted to engage the external threads on the body member of said coupling;
  (2) a first annular interior conical cam surface disposed on said nut axially outwardly of said threaded portion, said first cam surface tapering radially inwardly toward the axially outer end of said coupling nut, said first conical cam surface engaging the exterior surface of said annular bulge on said deformable portion when said coupling is assembled to cause said sharp annular edge to grip and bite into said tube being coupled and to cause said rounded annular edge to grip said tube when said coupling is assembled, and to compress said deformable sealing ring into engagement with said tube, thereby forming two distinct sealing grooves in said tube at said annular edges and to compress said sealing ring into fluid sealing engagement with said tube in the region extending along the surface of said tube between said two annular grooves;
  (3) a cylindrical interior portion extending axially outwardly from said first cam surface, said cylindrical portion being of greater inside diameter than the outside diameter of said radially outwardly extending annular rib on said body member;
  (4) a second annular interior conical cam surface disposed axially outwardly of said cylindrical portion and said first cam surface, said second cam surface tapering radially inwardly toward the axially outer end of said coupling nut, said second conical cam surface engaging said radially outwardly extending rib on the deformable portion of said body member and compressing it into sealing engagement with the exterior surface of the tube being coupled to form a third sealing groove in said tube adjacent the axially outer end of said coupling, thereby simultaneously forming a seal between the coupling nut and the rib on said body member and between the deformable portion of said body member and said tube to inhibit entrance of moisture into said coupling when said coupling is assembled.

10. A coupling as defined in claim 9 including:
(A) radially outwardly extending shoulder disposed on said rigid portion of said body member axially inwardly of said threaded portion; and
(B) a shoulder on the axially inner end of said coupling nut for engaging said shoulder on the rigid portion of said body member to form a seal between said nut and said body member to inhibit entrance of moisture into said coupling at the axially inner end of said coupling and to prevent overtightening of said coupling.

11. A coupling for a cylindrical tube comprising:
(A) a body member having an axially extending cylindrical bore therethrough for slidably receiving a tube to be coupled in close fitting engagement therewith, said body including:
  (1) a relatively rigid portion having external threads thereon;
  (2) a relatively thin deformable wall portion extending axially outwardly from said threaded portion;
  (3) a radially outwardly bulged wall section of substantially the same thickness as the remainder of said deformable wall portion disposed intermediate the ends of said deformable wall portion forming an annular inwardly open recess therein, the axially inner edge of said recess meeting said cylindrical bore in a smooth rounded annular edge for facilitating insertion of a tube to be coupled into said bore and the axially outer edge of said recess meeting said cylindrical bore at substantially a right angle to form a sharp annular toothed edge for gripping and biting into said tube to be coupled;
  (4) a radially outwardly extending annular rib adjacent the axially outer end of said deformable wall portion;
(B) a coupling nut having an axially extending cylindrical bore therethrough, an internally threaded portion adjacent the axially inner portion of said nut, said threaded portion being adapted to engage the external threads on the body member of said coupling; and an annular interior conical cam surface disposed on said nut axially outwardly of said threaded portion, said cam surface tapering radially inwardly toward the axially outer end of said coupling nut, said conical cam surface being adapted to engage the exterior surface of said annular bulge and the radially outwardly extending annular rib on the deformable portion of said body member when said coupling is assembled in a manner to join a tube therewith to thereby compress said deformable body portion so as to form three annular sealing regions on the surface of said tube being joined.

References Cited

UNITED STATES PATENTS

| | | | |
|---|---|---|---|
| 1,186,813 | 6/1916 | McFerran | 285—382.2 X |
| 2,226,039 | 12/1940 | Wiltse | 285—341 X |
| 2,625,955 | 1/1953 | Day | 138—89 |
| 2,693,374 | 11/1954 | Wurzburger | 285—382.7 X |
| 3,079,182 | 2/1963 | Appleton | 285—343 |
| 3,149,861 | 9/1964 | Larsson | 285—382.2 X |
| 3,235,292 | 2/1966 | Phillips | 285—343 X |

FOREIGN PATENTS

| | | |
|---|---|---|
| 1,228,281 | 3/1960 | France. |
| 1,266,673 | 6/1961 | France. |
| 416,503 | 9/1934 | Great Britain. |
| 859,576 | 1/1961 | Great Britain. |
| 309,529 | 7/1933 | Italy. |

THOMAS F. CALLAGHAN, *Primary Examiner.*

U.S. Cl. X.R.

285—343, 382.2, 287, 12, 158